(12) United States Patent
O'Shea et al.

(10) Patent No.: US 10,063,074 B2
(45) Date of Patent: Aug. 28, 2018

(54) ELECTRONIC WEARABLE DEVICE ELECTRODE PAD WITH COLLECTION WELL

(71) Applicant: Hewlett-Packard Development Company, L.P., Houston, TX (US)

(72) Inventors: Terrance O'Shea, Vancouver, WA (US); Tom E. Pearson, Vancouver, WA (US); Sridhar V Solur, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/088,674

(22) Filed: Apr. 1, 2016

(65) Prior Publication Data

US 2017/0288432 A1    Oct. 5, 2017

(51) Int. Cl.
```
H02J 7/00      (2006.01)
G01C 22/00     (2006.01)
H01R 13/22     (2006.01)
G06F 1/16      (2006.01)
H01R 24/60     (2011.01)
H01R 33/18     (2006.01)
H01R 24/86     (2011.01)
```

(52) U.S. Cl.
CPC ............ *H02J 7/0042* (2013.01); *G06F 1/163* (2013.01); *G01C 22/006* (2013.01); *H01R 13/22* (2013.01); *H01R 24/60* (2013.01); *H01R 24/86* (2013.01); *H01R 33/18* (2013.01)

(58) Field of Classification Search
CPC ....... H02J 7/0042; H01R 24/60; H01R 24/38; H01R 24/86; H01R 13/22; H01R 33/18; G04G 17/06; G01C 22/006

USPC ....... 439/692, 693, 695, 289, 190, 660, 750, 439/37, 205, 206; 362/103, 382
See application file for complete search history.

(56) References Cited

U.S. PATENT DOCUMENTS

| | | | | |
|---|---|---|---|---|
| 2,226,292 A | * | 12/1940 | Weston | ..................... F21S 8/04 362/437 |
| 3,304,708 A | | 2/1967 | Baehni | |
| 3,478,297 A | * | 11/1969 | Gimpel | ............... H01R 13/523 439/205 |
| 6,626,545 B2 | | 9/2003 | Gardner et al. | |
| 9,032,647 B2 | * | 5/2015 | Carnes | ..................... A43B 3/00 36/132 |
| 2006/0130938 A1 | | 6/2006 | Kramer | |
| 2009/0113870 A1 | | 5/2009 | Rejzner | |

OTHER PUBLICATIONS

Santonen, T. et al.; "Review on Toxicity of Stainless Steel" ; 2010.

* cited by examiner

*Primary Examiner* — Renee S Luebke
*Assistant Examiner* — Paul Baillargeon
(74) *Attorney, Agent, or Firm* — HP Inc. Patent Department

(57) ABSTRACT

Examples disclosed herein relate to an electronic wearable device electrode pad with a collection well. For example, the electronic wearable device may include an electrode pad used to recharge the electronic wearable device, a depression relative to the electrode pad to create a collection well, and an insulated area between the electrode pad and the collection well. The top surface of the electrode pad may be elevated relative to the bottom of the collection well when the electronic wearable device is positioned for recharging.

20 Claims, 5 Drawing Sheets

ELECTRONIC WEARABLE DEVICE ELECTRODE PAD WITH COLLECTION WELL

BACKGROUND

An electronic wearable device may be rechargeable. A user may connect the electronic wearable device to a recharging component to recharge the wearable electronic device. For example, the electronic wearable device may include an anode and cathode electrode used to recharge the device when the device is, connected to a recharging component, and each of the electrodes may have an associated electrode pad.

BRIEF DESCRIPTION OF THE DRAWINGS

The drawings describe example embodiments. The following detailed description references the drawings, wherein.

DETAILED DESCRIPTION

In one implementation, an electronic wearable device includes an electrode pad with an associated collection well. The collection well may collect fluid when the electronic wearable device is positioned for recharging such that fluid does not collect on the electrode pad during the recharging process. As an example, an electronic wearable device may include a first and second electrode pad to recharge the electronic wearable device when connected to a recharging component and a collection well adjacent to an insulated portion of at least one of the first and second electrode pad. The inner bottom portion of the collection well may be in a relative lower position than the top surface of the adjacent electrode pad when the electronic wearable device is positioned for recharging. The collection well may be positioned to collect fluid runoff from the adjacent electrode pad during and/or prior to the recharging process.

A collection well associated with an electrode pad on an electronic wearable device may slow or prevent corrosion of the electronic wearable device. An electronic wearable device may include an electrode pad on the outer portion of the electronic device such that it is adjacent to the user's skin during wear to hide the electrode pad from view. Sweat may collect on the electrode pad and on other outer portions of the electronic wearable device near the electrode pad, and the salt may remain on the electrode pad when the electrode pad is exposed to an electrical current during the recharging process. The salt exposure may accelerate corrosion, which may eventually inhibit the recharging process. In one implementation, an electrode pad is adjacent to a collection well such that the collection well collects sweat and other fluids during and/or prior to the recharging process. The water may evaporate, and the salt may remain in the collection well such that salt accumulation on the electrode pad is prevented or lessened, resulting in less corrosion.

Figure 1A:
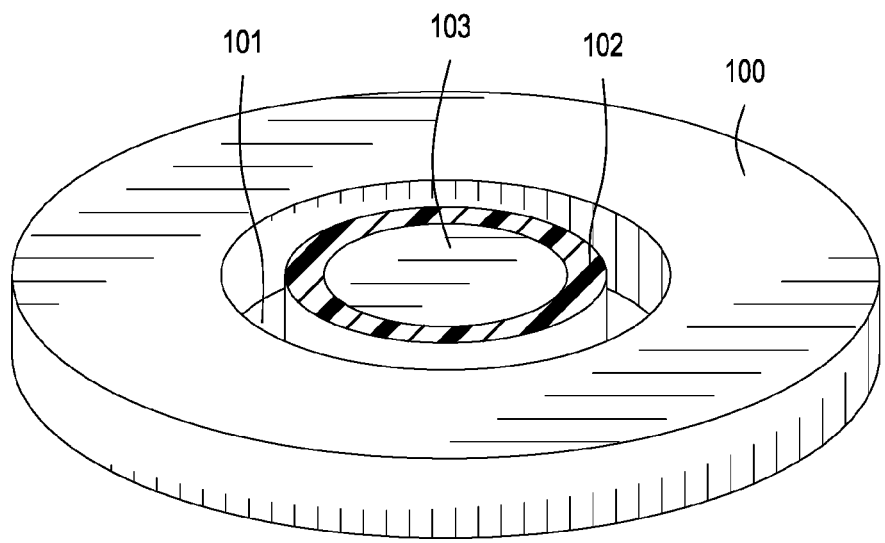
FIGS. 1A and 1B are diagrams illustrating examples of an outer bottom view of an electronic wearable device including an electrode pad with a collection well.
Figure 1B:
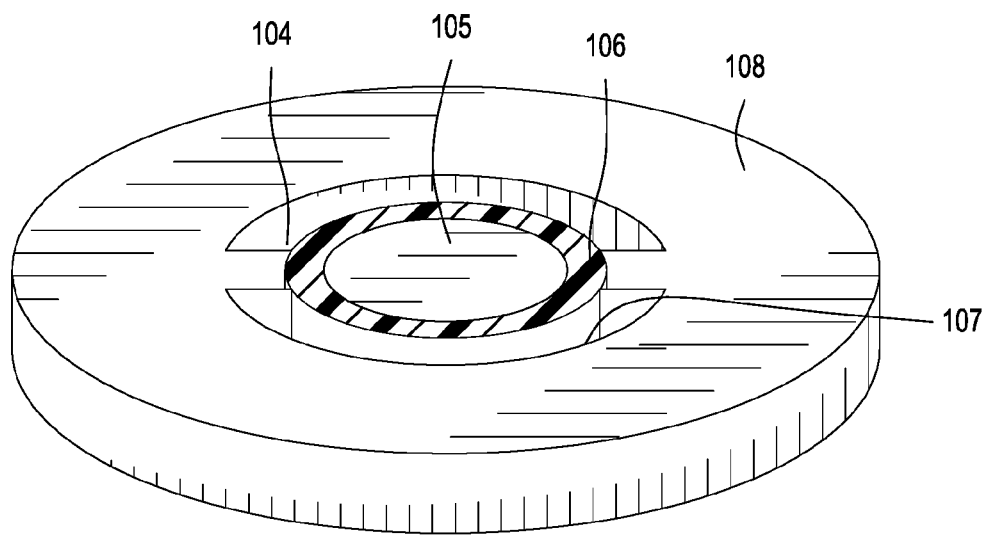

FIGS. 1A and 1B are diagrams illustrating examples of an outer bottom view of an electronic wearable device including an electrode pad with a collection well. FIG. 1A illustrates a view of an outer portion of the electronic wearable device 100. The electronic wearable device 100 may be any suitable electronic wearable device, such as a watch, jewelry item, or fitness tracking device. The electronic wearable device 100 may be a device designed to be worn next to a user's skin with at least a portion of the electronic wearable device 100 shown in FIG. 1A in contact with the user's skin. For example, the electronic wearable device 100 may be a watch where an electrode pad 103 is on the underside of the watch touching the user, and the opposite side of the electronic wearable device 100 includes the watch face.

The electronic wearable device 100 may have a recharging capability. The electronic wearable device 100 may include the electrode pad 103 used for recharging when in contact with a recharging component. The electrode pad 103 may receive a recharging pin associated with a recharging component where the recharging pins extend out of the recharging component. The electrode pad 103 may be associated with an anode or cathode electrode. The electrode pad 103 may be placed on any suitable position on the electronic wearable device 100. For example, the electrode pads may be placed on the portion of the device designed to be worn against a user's skin. The electrode pad 103 may be any suitable height, such as where the top surface of the electrode pad 103 is at the same height as other outer areas of the electronic wearable device 100 or the top surface of the electrode pad 103 may be slightly higher or lower than the nearby areas of the electronic wearable device 100, such as other areas on the same side of the electronic wearable device 100 outside of the collection well 100 on the same side of the electronic wearable device 100 as the electrode pad 103.

The electrode pad 103 may have an associated collection well 101. For example, the collection well 101 may be positioned to receive fluid runoff from the electrode pad 103. In one implementation, the electronic wearable device 100 includes two electrode pads and one or both of the electrode pads may have an associated collection well. The bottom of the collection well 101 may be at a lower elevation than the top surface of the electrode pad 103 when positioned for recharging. In one implementation, the electrode pad 103 is positioned such that the bottom of the electrode pad 103 is also above the bottom of the collection well 101.

The electronic device 100 may be placed in any suitable position for recharging. For example, a recharging component may be designed to be placed on top of the electronic wearable device for charging, may be designed to lay on a surface with the electronic wearable device placed on top of the recharging component, and/or the recharging component may be a vertical component such that the electronic wearable device is placed to the side of the recharging component. The collection well 101 may be positioned such that the bottom of the collection well 101 is below the top surface of the electrode pad 103 when the electronic device 100 is oriented for connecting to the recharging component.

An insulated area 102 may be situated between the electrode pad 103 and the collection well 101. The insulated area 102 may be made out of any suitable material, such as a non-conductive, non-ferrite material that does not contain salt. The insulated area 102 may prevent fluid collected in the collection well 101 from coming into contact with the electrode pad 103. The insulated area 102 may be in any suitable position relative to the electrode pad 103 and the collection well 101. For example, the insulated area 102 may be positioned below the bottom surface of the electrode pad 103 and above the bottom of the collection well 101. The insulated area 102 may be positioned vertically along the side surface of the electrode pad 103 when the electronic wearable device 100 is positioned for recharging. The insulated area 102 may extend along any portion of the vertical side of the electrode pad 103, such as where the insulated area 102 extends from the top surface of the electrode pad 103 to the side of the bottom surface of the electrode pad 103 or from the side of the top surface of the electrode pad to below the bottom surface of the electrode pad 103. The insulated area 102 may surround the entire electrode pad 103 or a portion of the electrode pad 103.

The collection well 101 may be in any suitable position relative to the electrode pad 103 such that the bottom of the collection well 101 is below the top surface of the electrode pad 103. The collection well 101 may be adjacent to the electrode pad 103 where the insulated area 102 is between at least a portion of the electrode pad 103 and the collection well 101. For example, the collection well 101 may completely surround the electrode pad 103 as shown in FIG. 1A or may be positioned adjacent to a portion of the electrode pad 103. The collection well 101 may be any suitable depth, such as 0.7 mm from the bottom of the electrode pad. The collection well 101 may be any suitable shape. For example, an edge of the collection well 101 may slant downward from the insulated area 102 to the bottom of the collection 101 to accelerate fluid runoff from the insulated area 102. The collection well may be made of any suitable material. For example, the outer surface of the collection well 101 may be made from the same material as the other surrounding outer portions of the electronic wearable device 100. In one implementation, the collection well 101 is made from a different material than the surrounding outer portions of the electronic wearable device 100, such as where the material is designed to promote fluid flow towards the bottom of the collection well 101.

FIG. 1B illustrates an outer portion of an electronic wearable device 108. Similar to the electronic wearable device 100, the electronic wearable device 108 includes an electrode pad, collection well, and insulated area. The electronic wearable device 108 includes an electrode pad 105 and an insulated area 106 surrounding a portion of the electrode pad 105. The insulated area 106 may be adjacent to any portion of the electrode pad 105 such as where the insulated area 106 surrounds the electrode pad 105 or is adjacent to a portion of the electrode pad 105, such as adjacent to the portion of the electrode pad 105 with an associated collection well. The electronic wearable device 108 may include any suitable number of collection wells. The electronic wearable device 108 includes two collection wells 104 and 107. Each collection well may be have any number of depressions or other contours to form the collection well. The collection wells 104 and 107 may be slanted, angular, rounded, or any other shape to form a collection area adjacent to the electrode pad 105.

Figure 2:
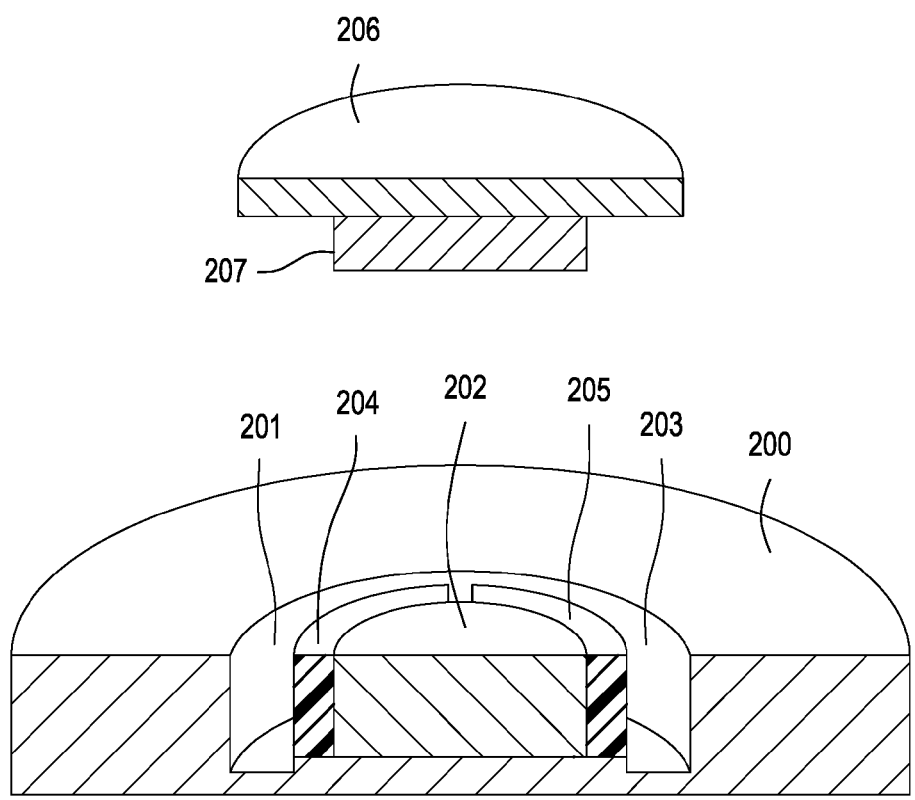
FIG. 2 is a diagram illustrating one example of a vertical cross section view of an electronic wearable device including an electrode pad with a collection well.

FIG. 2 is a diagram, illustrating one example of a vertical cross section view of an electronic wearable device including an electrode pad with a collection well. The electronic wearable device 200 is shown with a cross section through the middle of the electrode pad 202. The electronic wearable device 200 is shown positioned for charging with the electrode pad 202 facing upwards to come into contact with recharging component 206. The electronic wearable device 200 includes an electrode pad 202 that may recharge the electronic wearable device 200 when coming into contact with recharging pin 207. The electrode pad 202 may be associated with collection wells 201 and 204. The collection wells 201 and 204 may be part of the same well surrounding the electrode pad 202 or may be separate depressions adjacent to the electrode pad 202. The electrode pad 202 may have insulated areas 204 and 205 to create buffers between the electrode pad 202 and fluid runoff collected in the collection wells 201 and 204. The insulated areas 204 and 205 shown from the cross section view of FIG. 2 may be part of the same material surrounding the electrode pad 202 or may be separate insulated areas.

The electronic wearable device 200 may be recharged when coming into contact with the recharging component 206. The recharging component 206 may include or be connected to a power supply, and a recharging pin 207 associated with the recharging component 206 may come into contact with the electronic wearable device 200 to recharge the electronic wearable device 200. The electronic wearable device 200 may be designed to be recharged in any suitable orientation, and the collection wells 201 and 204 may be designed such that the bottom of the wells are at a lower elevation than the top surface of the electrode pad 202 when the electronic wearable device 200 is positioned for recharging. FIG. 2 shows the electronic wearable device 200 positioned with a recharging component 206 placed on top of the electronic wearable device to allow the recharging pin 207 to come into contact with the electrode pad 202.

Figure 3A:
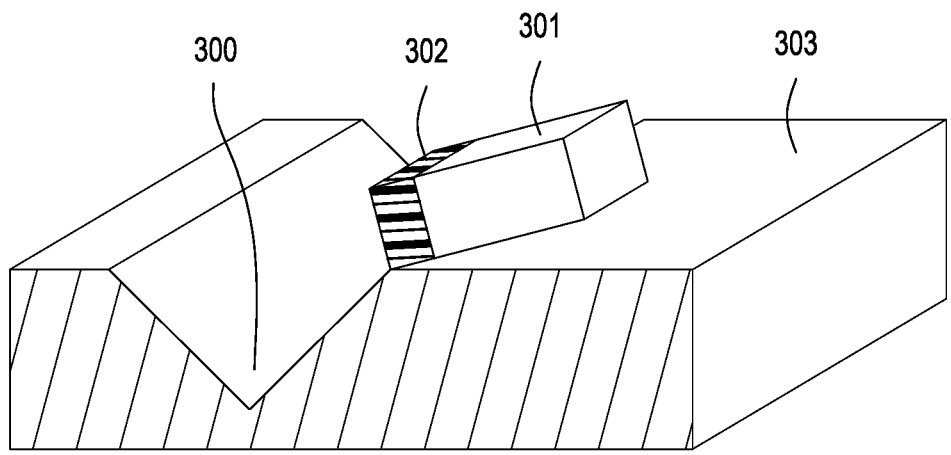
FIGS. 3A and 3B are diagrams illustrating examples of a vertical cross section view of an electronic wearable device with an electrode pad and/or insulation area with a non-planar top surface slanted toward the bottom of a collection well.
Figure 3B:
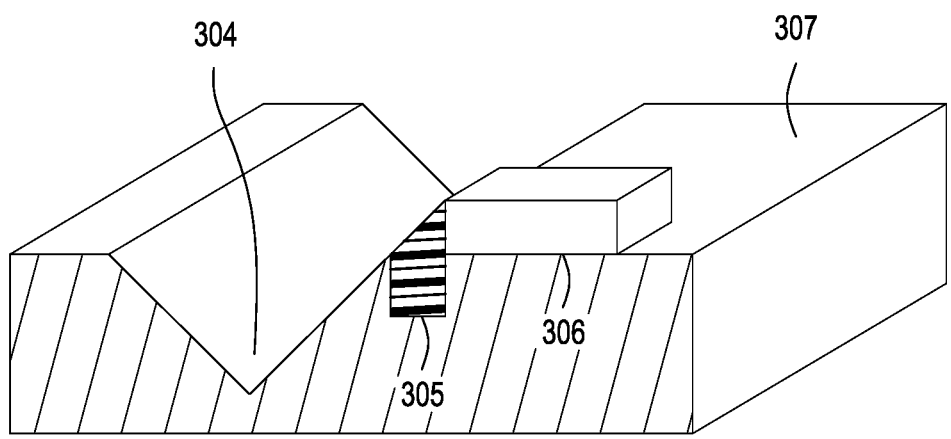

FIGS. 3A and 3B are diagrams illustrating examples of a vertical cross section view of an electronic wearable device with an electrode pad and/or insulation area with a non-planar top surface slanted toward the bottom of a collection well. For example, the surface of the electrode pad and/or insulation area may be non-planar to promote fluid flow into a collection well. The number, shape, and/or position of collection wells may be adapted based on the angle of the electrode pad and/or insulation area, such as where a collection well is deeper if the particular collection well or collection well area is likely to collect more fluid due to a steeper angle from the top surface of the electrode pad and/or insulation area into the collection well. In one example, an electrode pad and insulation area slant a particular direction, and the collection well is positioned such that it collects fluid runoff proceeding in the direction of the slanted surface to the collection well.

FIG. 3A illustrates an electronic wearable device 303 with an electrode pad 301, insulation area 302, and collection well 300. The electrode pad 301 and insulation area 302 slant towards the bottom of the collection well 300 at an angle to encourage fluid flow away from the top surface of the electrode pad 301 and into the collection well 300. The top surface of the electrode pad 301 and the top surface of the insulation area 302 may slant at different angles, such as where the electrode pad 301 is at a first angle towards the collection well 300 and the insulation area 302 is at a greater angle towards the collection well 300. The resulting non-planar surfaces may promote fluid flow into the collection well 300.

FIG. 3B illustrates an electronic wearable device 307 with an electrode pad 306, insulation area 305, and collection well 304 such that the insulation area 305 has a non-planar top surface to slant from the top of the electrode pad 306 towards the bottom of the adjacent collection well 304. The insulation area 305 is angled with a first side adjacent to the electrode pad 306 and a second side slanted downward toward the bottom of the collection well 304. In one implementation, there are multiple insulation areas surrounding an electrode pad, and the insulation areas slant downwards towards different collection wells or different areas of the same collection well. The insulation area may 305 may surround the electrode pad 306, and the insulation area 305 may have a non-planer top surface surrounding the electrode pad to cause fluid to flow into a collection well surrounding the insulation area 305. In one implementation, the insulation area 305 may be placed next to particular areas of the electrode pad 306, and the insulation area 305 may have a non-planar top surface to promote fluid flow to collection wells associated with the particular areas.

Figure 4:
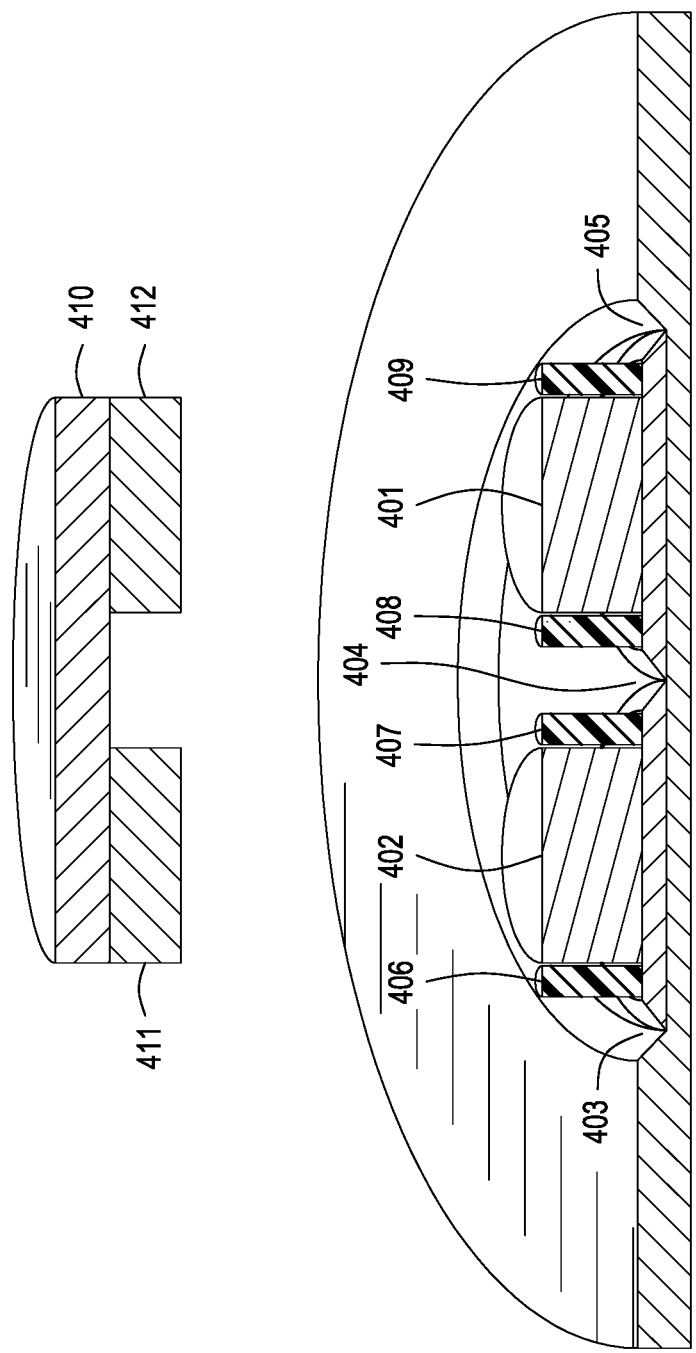
FIG. 4 is a diagram illustrating one example of a vertical cross section view of an electronic wearable device with electrode pads with collection wells and an associated recharging component.

FIG. 4 is a diagram illustrating one example of a vertical cross section view of an electronic wearable device with electrode pads with collection wells and the associated recharging component. The electronic wearable device 400 includes electrode pad 402 and electrode pad 401 for recharging the electronic wearable device 400 such that one of the electrode pads is connected to anode electrode and one of the electrode pads is connected to a cathode electrode. For example, the recharging component 410 may be used to recharge the electronic wearable device 400 when the electrode pad 402 comes into contact with recharging pin 411 and electrode pad 401 comes into contact with recharging pin 412. The electrode pads 402 and 401 have surrounding insulated areas 406-409 adjacent to at least a portion of the electrode pads 401 and 402. The insulated areas 406 and 407 may be a continuous material surrounding electrode pad 402 or may be separate insulated areas surrounding the electrode pad 402. Similarly, the insulated areas 408 and 409 may form a continuous insulation area surrounding the electrode pad 401, or the insulated areas 408 and 409 may surround a portion of the outer side of the electrode pad 401.

The electronic wearable device 400 may include a collection well 404 between the electrode pad 401 and electrode pad 402. The collection well 404 may extend to other sides of the electrode pads such as where the collection wells 403 and 405 are part of the collection well 404 and/or there may be additional collection wells such that collection well 403 and/or collection well 405 are separate collection wells. In one implementation, the electrode pads 401 and 402 and/or the insulated areas 407 and 408 have non-planar top surfaces slanting towards the bottom of the collection well 404. The collection well 404 between the electrode pads 401 and 402 may prevent fluid from remaining on the electrode pads 401 and 402 during the recharging process.

Figure 5:
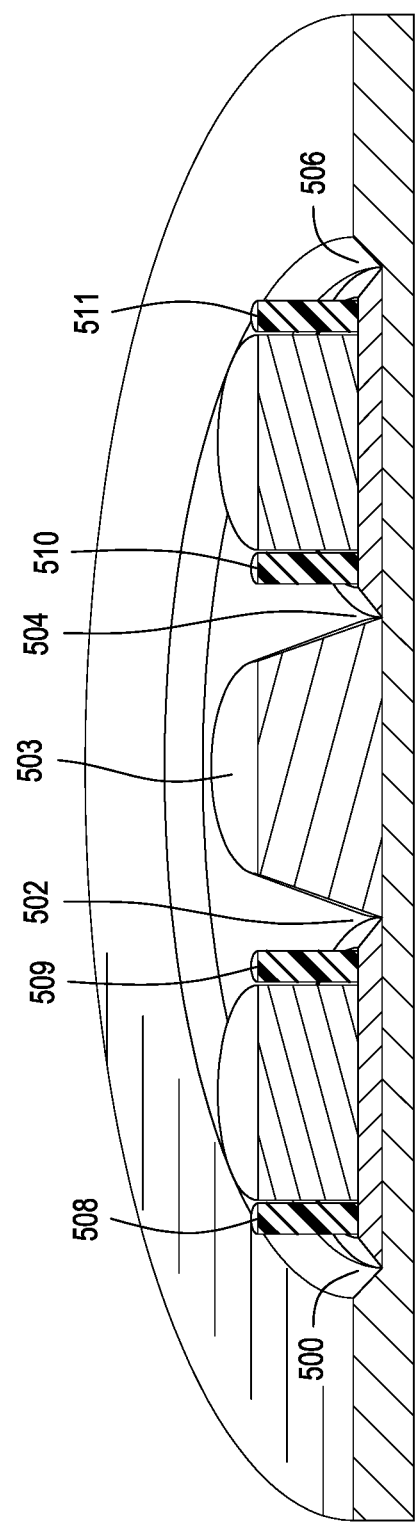
FIG. 5 is a diagram illustrating one example of a vertical cross section view of an electronic wearable device with an elevated surface between two electrode pads with collection wells.

FIG. 5 is a diagram illustrating one example of a vertical cross section view of an electronic wearable device with an elevated surface between two electrode pads with collection wells. FIG. 5 shows a cross section view of electronic wearable device 507 where the electronic wearable device 507 is oriented for recharging. The electronic wearable device 507 includes electrode pads 501 and 505. Electrode pad 501 includes insulated areas 508 and 509 that surround at least a portion of the electrode pad 501. The insulated areas 508 and 509 may form a continuous portion of an insulated material surrounding the electrode pad 501. Electrode pad 505 is adjacent to insulated areas 510 and 511 that at least partially surround the electrode pad 505.

An elevated surface 503 is positioned between the electrode pad 501 and the electrode 505 with collection well 502 between the electrode pad 501 and the elevated surface 503 and collection well 504 between the electrode pad 505 and the elevated surface 505.

The elevated surface 503 may be made of any suitable material, such as the same material as a collection well and/or the same material as the surrounding part of the electronic wearable device 507 outer surface. The elevated surface 503 may be situated in any position such as half way between the two electrode pads 501 and 505. The elevated surface 503 may be elevated at any suitable height relative height to the electrode pads 501 and 505 and the collection wells 502 and 504. For example, the top surface of the elevated surface 503 may be above the top surface of the electrode pads 501 and 505 when positioned for recharging. The top surfaces of the electrode pads 501 and 505 may at the same or different heights relative to one another. The elevated surface 503 may be positioned to prevent electrical current from flowing between electrode pad 501 and 505 and across an associated fluid collection well. The elevated surface 503 may further protect the electrode pads 501 and 505 from salt exposure during recharging and resulting corrosion by preventing fluid flow between the electrode pads 501 and 505. The recharging component may have pins that extend lower than the elevated surface 503 to the electrode pads 501 and 505.

The elevated surface 503 may have a planar or non-planar top surface. For example, the top surface of the elevated surface 503 may be slanted towards one or both of the collection wells 502 and 504. The elevated surface 503 may be any dimension or shape. In one implementation, the width of the top surface of the elevated surface 503 is 5 mm across between the electrode pad 501 and the electrode pad 505.

The electronic wearable device 507 includes collection wells 500, 502, 504, and 506. The collection wells may be individual collection wells or different areas of the same collection well. The electronic wearable device 507 may include any number of collection wells positioned in any suitable positions surrounding the electrode pads 501 and 505. The elevated surface 503 may be adjacent to collection wells 502 and 504 such that any fluid collecting on the elevated surface may be routed into the collection wells 502 and 504 to prevent fluid collection on the top surface of the electrode pad 501 or 505.

An electronic wearable device may include any suitable number of collection wells of any suitable shapes and sizes to promote fluid runoff into the collection well and to prevent fluid collection on an electrode pad for recharging. Positioning a collection well relative to an electrode pad may prevent corrosion and lengthen the life span of an electronic wearable device.

The invention claimed is:

1. An electronic wearable device, comprising:
an electrode pad and second electrode pad used to recharge the electronic wearable device;
a depression relative to the electrode pad to create a collection well;
an insulated area between the electrode pad and the collection well; and
an elevated surface relative to the electrode pad positioned between the electrode pad and the second electrode pad,
wherein the top surface of the electrode pad is elevated relative to the bottom of the collection well when the electronic wearable device is positioned for recharging, and wherein the top portion of the elevated surface is above the top portion of the electrode pad when positioned for recharging.

2. The electronic wearable device of claim 1, wherein the electronic wearable device comprises a plurality of collection wells such that a second collection well is positioned between the electrode pad and a second electrode pad.

3. The electronic wearable device of claim 1, wherein the insulated area surrounds the electrode pad and wherein the collection well surrounds the insulated area.

4. The electronic wearable device of claim 1, wherein at least one of the electrode pad and the insulated area comprises a non-planar top surface slanting downward toward the bottom of the collection well.

5. The electronic wearable device of claim 1, wherein the electrode pad recharges the electronic wearable device when connected to a recharging component that is placed on top of the electronic wearable device.

6. The electronic wearable device of claim 1, wherein the depth of the collection well is at least 0.7 mm.

7. An electronic wearable device, comprising:
a collection well adjacent to an electrode pad used to recharge the electronic wearable device; and
an elevated surface between the electrode pad and a second electrode pad,
wherein the collection well is formed between the elevated surface and the electrode pad and between the elevated surface and the second electrode pad,
wherein an insulated material is positioned between the collection well and the electrode pad, and
wherein the collection well is positioned at a lower elevation on the electronic wearable device relative to the top surface of the electrode pad when the electronic wearable device is positioned for recharging with a recharging component.

8. The electronic wearable device of claim 7, wherein the electronic wearable device comprises the collection well and a second collection well,
wherein the collection well is positioned adjacent to the electrode pad on a first side of the electrode pad, and
wherein the second collection well is positioned adjacent to both the electrode pad on a second side of the electrode pad and adjacent to a second electrode pad.

9. The electronic wearable device of claim 7, wherein the top surface of at least one of the electrode pad and the insulated area comprises a non-planar top surface slanting downward toward the bottom of the collection well.

10. The electronic wearable device of claim 7, wherein the insulating material comprises a non-ferrite material.

11. The electronic wearable device of claim 7, wherein the outer surface of the collection well comprises a different material than an adjacent outer portion of the electronic wearable device.

12. The electronic wearable device of claim 7, wherein the insulating material surrounds the electrode pad.

13. The electronic wearable device of claim 7, wherein the collection well surrounds the insulating material.

14. An electronic wearable device, comprising:
a first and second electrode pad to recharge the electronic wearable device when connected to a recharging component;
a collection well adjacent to an insulated portion of at least one of the first and second electrode pad; and
an elevated surface between the first and second electrode pad,
wherein at least one of the collection well or a second collection well is formed adjacent to the elevated surface between the elevated surface and the first and second electrode pads,
wherein the inner bottom portion of the collection well is in a relative lower position than the top surface of the adjacent electrode pad when the electronic wearable device is positioned for recharging, and
wherein the collection well is positioned to collect fluid runoff from the adjacent electrode pad when the electronic wearable device is positioned for recharging.

15. The electronic wearable device of claim 14, wherein the top surface of the at least one of the adjacent electrode pad and the insulated portion is a non-planar surface to promote fluid runoff into the adjacent collection well.

16. The electronic wearable device of claim 14, wherein the electronic wearable device comprises at least one of: a watch, piece of jewelry, and fitness tracking device.

17. The electronic wearable device of claim 14, wherein the electronic wearable device comprises three collection well areas, wherein a first collection well area is adjacent to the first electrode pad, the second collection well area is adjacent to the second electrode pad, and the third collection well area is between the first and second electrode pad.

18. The electronic wearable device of claim 14, wherein the insulating material surrounds at least one of the first and second electrode.

19. The electronic wearable device of claim 14, wherein the collection well surrounds the insulating material.

20. The electronic wearable device of claim 14, wherein the depth of the collection well is at least 0.7 mm.

* * * * *